(No Model.)
A. DAVIS.
TWO WHEELED VEHICLE.
No. 300,051. Patented June 10, 1884.
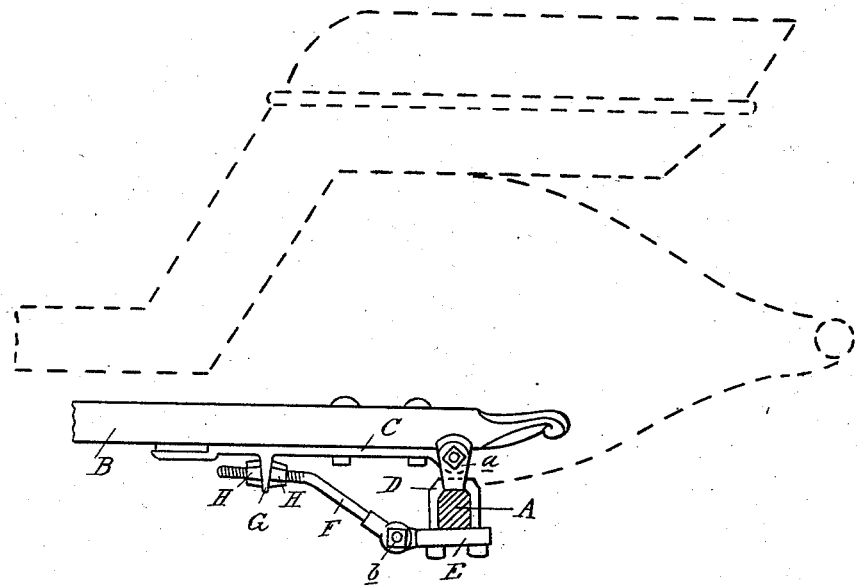
Attest
J. Paul Mayer
Inventor
Albert Davis
By Thos. S. Sprague
Att'y

UNITED STATES PATENT OFFICE.

ALBERT DAVIS, OF MASON, MICHIGAN, ASSIGNOR TO THE MASON ROAD CART COMPANY, OF SAME PLACE.

TWO-WHEELED VEHICLE.

SPECIFICATION forming part of Letters Patent No. 300,051, dated June 10, 1884.

Application filed December 26, 1883. (No model.)

*To all whom it may concern:*

Be it known that I, ALBERT DAVIS, of Mason, in the county of Ingham and State of Michigan, have invented new and useful Improvements in Two-Wheeled Vehicles; and I do hereby declare that the following is a full, clear, and exact description thereof, reference being had to the accompanying drawing, which forms a part of this specification.

This invention relates to certain new and useful improvements in the construction of two-wheeled vehicles, the object of the invention being to provide means for adjusting the body.

The invention consists in the peculiar construction and arrangement of an adjusting-rod, in combination with the axle and shafts, all as more fully hereinafter set forth.

In the accompanying drawing, which forms a part of this specification, the invention is shown in side elevation, and in which A represents the axle, and B the rear extension of the shafts. To the under side of the shafts and at the rear ends thereof is rigidly secured the strap-iron C, provided with an eye, which engages with the upwardly-projecting ears $a$ of the clip D, which embraces the axle.

E is the tie-bar at the bottom of the clip D, and projects forward, terminating in an eye, $b$, which engages with the bifurcated end of the rod F, the opposite end of which passes through a hole in the lug G, pendent from the strap-iron C, and receives two nuts, H, one upon either side of the lug G. By this construction it will readily be seen that the ends of the body can easily be raised or lowered, as may be desired.

I am aware of Patents Nos. 270,700 and 286,734, and make no claim to the constructions shown therein.

What I claim as my invention is—

In a two-wheeled vehicle, the combination of the axle A, shafts B, clip D, provided with the ears $a$, strap-iron C, having lug G and an eye to engage with the ears $a$, tie-bar E, provided with the eye $b$, rod F, pivoted at one end to the axle, and the other end adapted to pass through and be supported by said lug, and the nuts H, whereby the shaft B and its adjusting-rod are pivotally secured to the axle, substantially as and for the purposes described.

ALBERT DAVIS.

Witnesses:
JNO. C. SQUIERS,
JOHN W. WHALLON.